US009772495B2

(12) United States Patent
Tam et al.

(10) Patent No.: US 9,772,495 B2
(45) Date of Patent: Sep. 26, 2017

(54) DIGITAL LOUPE DEVICE

(71) Applicants: Weng-Kong Tam, Hualien (TW);
Kai-Pok Tse, Kowloon (HK)

(72) Inventors: Weng-Kong Tam, Hualien (TW);
Kai-Pok Tse, Kowloon (HK)

(*) Notice: Subject to any disclaimer, the term of this patent is extended or adjusted under 35 U.S.C. 154(b) by 374 days.

(21) Appl. No.: 14/531,951

(22) Filed: Nov. 3, 2014

(65) Prior Publication Data

US 2015/0123880 A1    May 7, 2015

Related U.S. Application Data

(60) Provisional application No. 61/899,323, filed on Nov. 4, 2013.

(51) Int. Cl.
*G02B 27/01* (2006.01)
*G02B 25/00* (2006.01)

(52) U.S. Cl.
CPC ........ *G02B 27/0172* (2013.01); *G02B 25/004* (2013.01); *G02B 2027/0138* (2013.01); *G02B 2027/0154* (2013.01); *G02B 2027/0178* (2013.01)

(58) Field of Classification Search
CPC ........ G06F 3/012; G06F 3/013; H04N 5/7491
See application file for complete search history.

(56) References Cited

U.S. PATENT DOCUMENTS

| 5,485,172 A * | 1/1996 | Sawachika | G02B 27/017 345/102 |
| 2003/0107643 A1* | 6/2003 | Yoon | G03B 35/20 348/47 |
| 2005/0206583 A1* | 9/2005 | Lemelson | A61B 1/00048 345/7 |
| 2008/0088646 A1* | 4/2008 | Sako | H04N 13/044 345/647 |
| 2008/0211921 A1* | 9/2008 | Sako | H04N 5/232 348/207.1 |
| 2010/0085462 A1* | 4/2010 | Sako | G02B 27/017 348/333.01 |
| 2010/0253904 A1* | 10/2010 | Jannard | A61B 5/1112 351/158 |
| 2011/0145978 A1* | 6/2011 | Harbin | G02B 7/002 2/209.13 |
| 2014/0002587 A1* | 1/2014 | Aguren | H04N 13/044 348/36 |

(Continued)

*Primary Examiner* — Priyank Shah
(74) *Attorney, Agent, or Firm* — Chun-Ming Shih; HDLS IPR Services

(57) ABSTRACT

The present invention provides a digital loupe device and its automatic view stabilizing method. The digital loupe device is worn or head-mounted on the operator's head via a wearable frame that is connected to a plural of axial rotation modules. A pair of lighting capture modules set on the axial rotation module is used to illuminate the target view and capture the image of the target view in order to send feedback signal. Both the lighting capture modules and axial rotation modules are electronically connected to at least one control unit. The control unit, base on the feedback signal received, moves the lighting capture modules via the axial rotation modules till the desired image of the target view is obtained. The display module connected to the wearable frame can show the captured image and information provided by the control unit.

16 Claims, 5 Drawing Sheets

(56) References Cited

U.S. PATENT DOCUMENTS

2014/0063055 A1* 3/2014 Osterhout ............... G06F 3/005
  345/633
2014/0340286 A1* 11/2014 Machida ............ G02B 26/0833
  345/8
2015/0332620 A1* 11/2015 Sako ....................... G06F 3/011
  345/8

* cited by examiner

DIGITAL LOUPE DEVICE

BACKGROUND OF THE INVENTION

Field of the Invention

The present invention relates to a digital microsurgical visualization device. More specifically, the invention comprises a digital loupe device which optionally replaces the conventional surgical loupe and microscope.

Description of Prior Art

Microsurgery has been increasingly being practiced in hospitals. Medical surgeons are often required to manipulate very small hard and soft tissue which is usually difficult to be observed by un-aided eyes. Some of those tiny surgical objects, such as vascular structure, nerve and other tissue, may have the diameter of less than 1 mm. Precise magnifying equipment, thus, is crucial for a microsurgery.

Please refer to FIG. 1 and FIG. 2, two most commonly used surgical visual tools, namely binoculars surgical loupes and binocular surgical microscope are showed. The features of surgical loupe and microscope are compared and shown in the below table.

|  | Loupes | Microscopes |
|---|---|---|
| magnification | 2.5, 3.0, 3.5, 4.0, 4.5× | 6×-25× |
| Adjustable magnification | No | Yes |
| focal length | Fixed | Adjustable |
| wearable | Yes | No |
| comfortable | Yes | No |
| field of view | Large | Small |
| portability | Yes | No |
| Cost | Low | High |

However, the above two optical instruments have weaknesses.

Firstly, they require the operating surgeons keeping at some fixed working distance and posture throughout the whole operation. Hence, it leads to musculoskeletal problems and pain, especially, over the back spines of surgeons.

Secondly, prolonged focusing through optical lens in the loupe or microscope during surgery will cause eye strains.

Thirdly, in high magnification mode, the magnified view shifts unsteadily with unintentional movement of the observer's head. Such motion increases focusing difficulty and further affect/damage/endanger visibility. These complications of using the surgical loupes and microscopes are not only harmful to the health of the surgeons, but directly affect the performance of the operation and quality of the treatment.

The present invention provides a sophisticated surgical digital visualization device that solves the above-mentioned complications.

SUMMARY OF THE INVENTION

The present invention is to provide a digital microsurgical visualization device and its view stabilizing method. A capturing element with auto-focusing function is used to capture the image of the surgical view and, according to the operator's command which is either verbally or digitally; the surgical view will be, but not limited to, zoom in/out, recorded or stabilized accordingly. The lighting element adjusts light intensity and focus accordingly in order to achieve a proper brightness of image at varying distance. The desired view image will be shown on the Virtual Retinal Display (VRD) display module for viewing during the surgery. VRD provides image display technology in which the laser beam of the image will directly scan onto the retina inside the eyes. This method enables the surgeons to move freely, instead of prolonged fixing at a close distance, and reduces the risk of eye strains. The surgery quality is improved and the surgical time is shortened. Both patients and surgeons are finally benefited.

To achieve the above-mentioned purpose, the present invention provides an automatic microsurgical visualization device. The said automatic microsurgical visualization device comprises a capturing element and a lighting element inside a lighting capture module. The lighting capture modules are preferably positioned at operator's eyes level on both sides. A sensor component is built inside the lighting capture module to receive the verbal command of the operator. Two display modules locate in front of the operator's eyes, preferably at the level of lower eyelids as equivalent to the position of conventional surgical loupes. The lighting capture modules are connected to a wearable eyeglass frame or head-mounted frame on both sides via the axial rotation modules. The axial rotation modules enable the lighting capture modules to rotate horizontally and vertically for capturing desired surgical view. The display modules are connected immovably to the wearable eyeglass frame or head-mounted frame. The lighting capture modules are set to light the target view and capture the image of the target view constantly and send according feedback signal. At least one control unit is electronically connected to lighting capture modules for receiving the feedback signal that is used to move the lighting capture modules via axial rotation modules, adjust the image focus or illuminant until the desired image of the surgical view is obtained.

The present invention also provides an automatic view stabilizing method that uses at least one lighting capture module that is set on at least one axial rotation module. First, the lighting capture module illuminates the target view, capture the image of the surgical view and send an according feedback signal. Then, the feedback signal received is used to move the lighting capture module via the axial rotation module in order to keep a shifted surgical view back to the original location previously. If the feedback signal also reveals an inappropriate light intensity of the image either brighter or darker than the threshold set forth in system, the lighting element inside a lighting capture module will be adjusted accordingly in order to provide proper light intensity and focus on the surgical view in order to keep the image in good brightness condition for the surgeon. Finally, the two images captured by the lighting capture modules on both sides have to be automatically aligned and superimposed at some points so that the operator will not suffer from double visions of the images presented.

For further understanding and acknowledge of the structural characteristic and the effects of the present invention, the following preferred embodiments and figures are illustrated.

DETAILED DESCRIPTION OF THE INVENTION

The detailed description and technical contents of the present invention will become apparent with the following detailed description accompanied with related drawings. It is noteworthy to point out that the drawings is provided for the illustration purpose only, but not intended for limiting the scope of the present invention.

Figure 1:
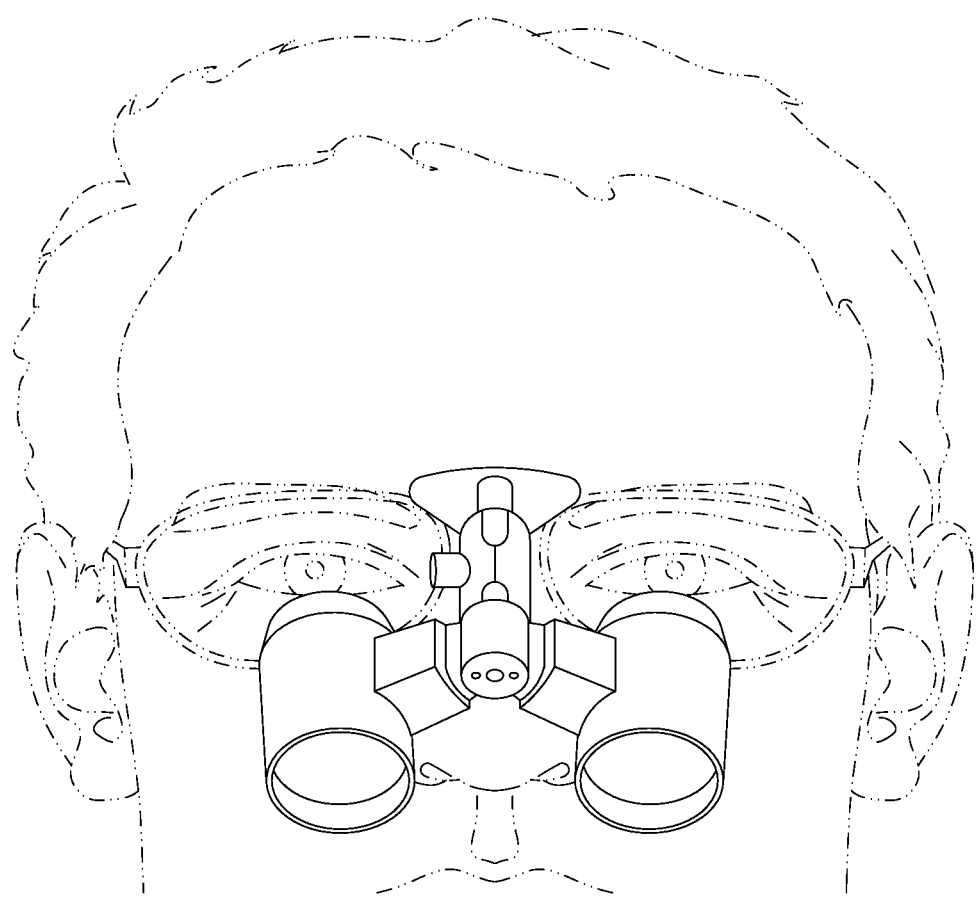
FIG. 1 shows a prior-art binoculars surgical loupe.
Figure 2:
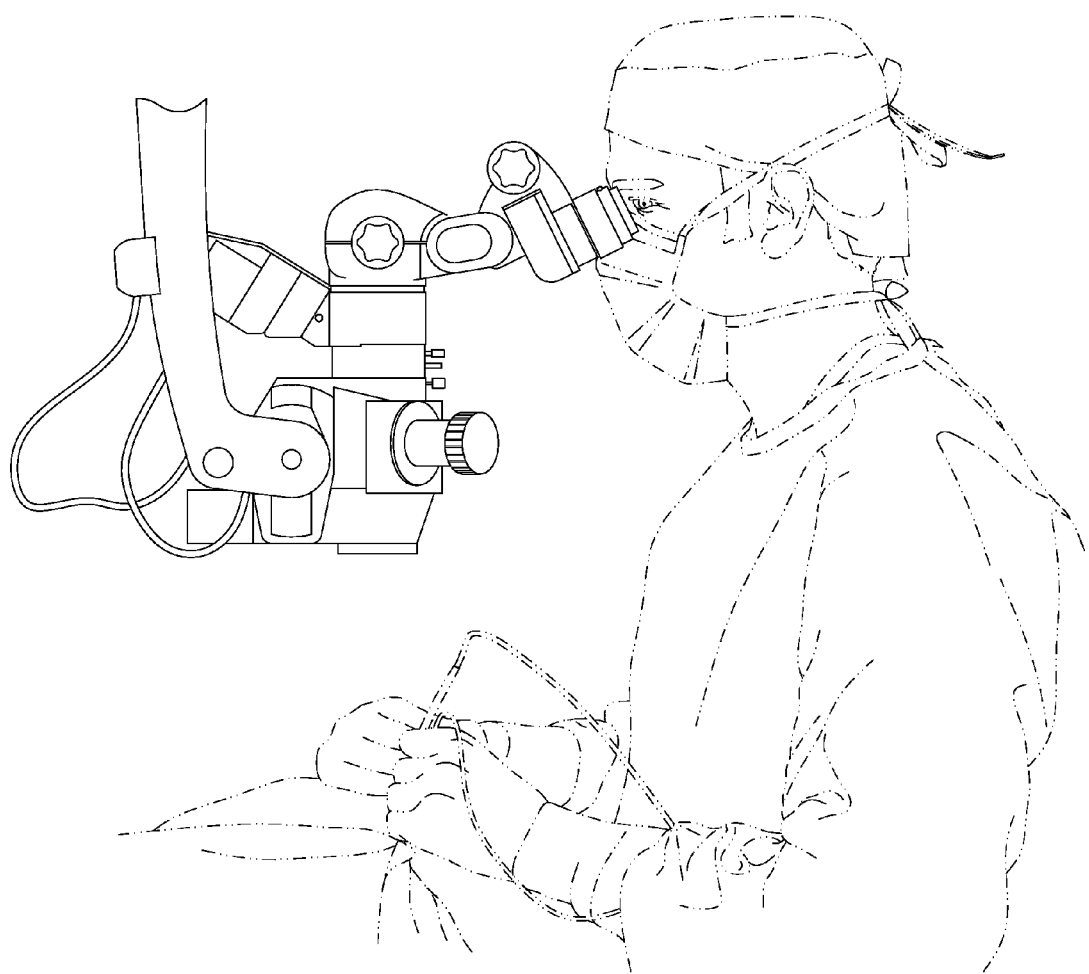
FIG. 2 shows a prior-art binocular surgical microscope.
Figure 3:
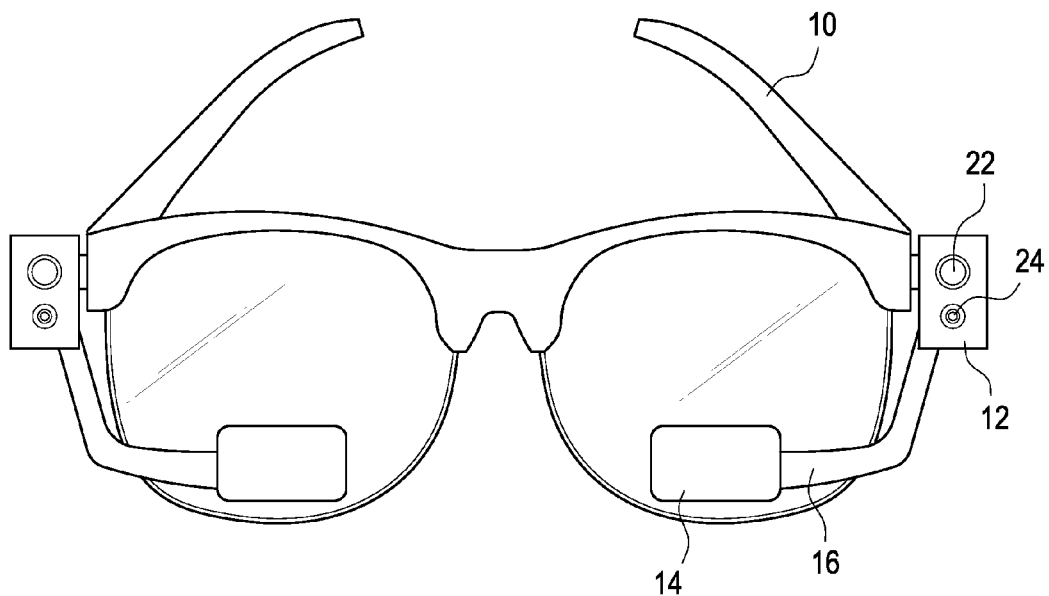
FIG. 3 is the schematic diagram of the front view of the present invention.
Figure 4:
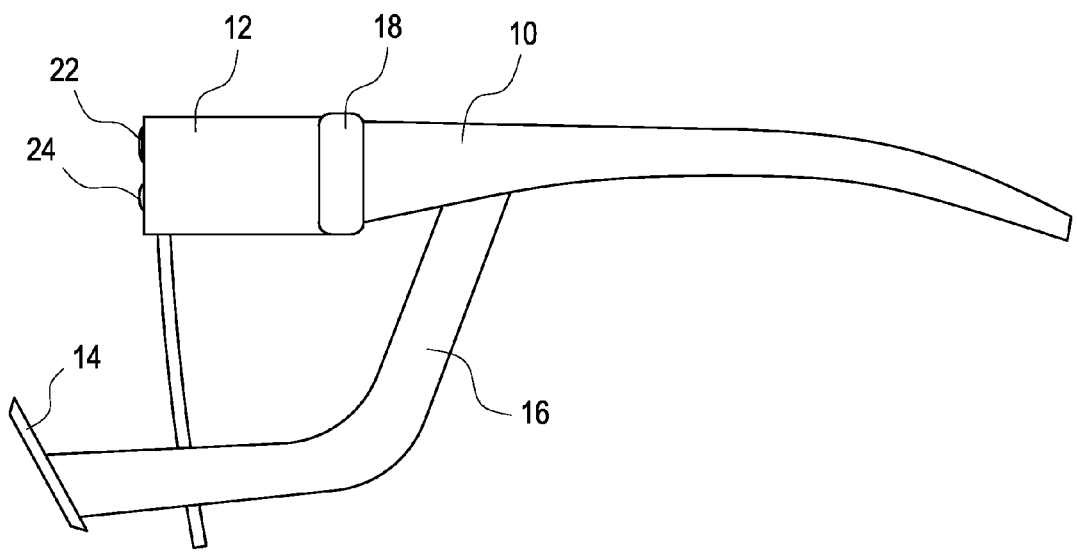
FIG. 4 is the schematic diagram of the lateral view of the present invention.
Figure 5:
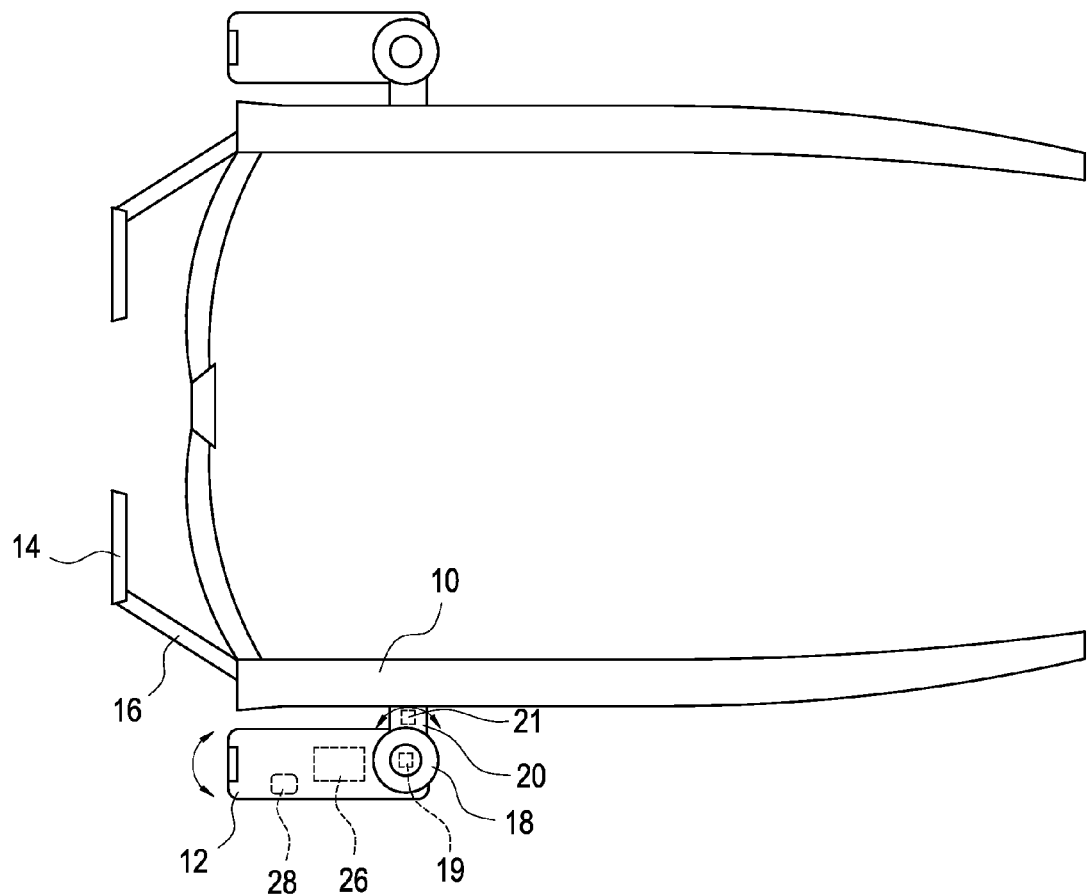
FIG. 5 is the schematic diagram of the top view of the present invention.

FIGS. 3 to 5 show a preferred embodiment of the digital loupe device of the present invention. The digital loupe device is preferably a wearable or head-mounted device that is worn on the surgeon's head. The surgeon can observe a magnified surgical view on the display modules of the digital loupe device.

The digital loupe device comprises a wearable frame 10, a pair of lighting capture modules 12, at least one axial rotation modules 18,20, a pair of display modules 14 and at least one control unit 26. The wearable frame 10 is preferably an eyeglass or head-mounted frame. The wearable frame 10 can be worn on the surgeon's head. Here the wearable frame 10 is used as a framework for holding the lighting capture modules 12 and display modules 14 on the surgeon's head near the eyes. The lighting capture modules 12 are separately attached to opposite lateral sides of the wearable frame 10 in symmetry through the first axial rotation modules 18 and the second axial rotation modules 20, as shown in FIG. 5. The first axial rotation modules 18 and the second axial rotation modules 20 are connected with the lighting capture modules 12 and mounted to the wearable frame 10, and are electronically connected to the control unit 26. Through the control signal transmitted from the control unit 26, the first axial rotation modules 18 enable lateral rotation (left and right) of the lighting capture modules 12 and the second axial rotation modules 20 enable vertical rotation (up and down) of the lighting capture modules 12. The display modules 14 are located in front of the wearable frame 10 and connected to the wearable frame 10 on both sides through the connectors 16. In the illustration shown in FIGS. 3 and 4, the lighting capture modules 12 are preferably positioned laterally at the same level of the operator's eyes and the display modules 14 at the lower eyelids level in front of the eyes.

A lighting capture module 12 further comprises a lighting element 22, a capturing element 24 and a sensor 28. At least one lighting element 22 and at least one capturing element 24 are electronically connected to the control unit 26. The capturing element 24 records the surgical view images and sends feedback signal electronically to the control unit 26. With the control signal from the control unit 26, the light intensity and focus of the surgical view can be adjusted through the lighting element 22 accordingly. The feedback signal can change the target surgical view by adjusting the orientation of the lighting capture modules 12 through rotating the first axial rotation modules 18 and the second axial rotation modules 20. The zooming function of the capturing element 24 enables zoom in/out of the images and provides changeable magnification of the surgical view. The auto-focusing function of the capturing element 24 allows the surgical view at varying distances to be in focus and provides changeable working distance for surgeon. Furthermore, the first axial rotation modules 18 has a first micro motor 19 which drives the first axial rotation modules 18 rotating, and the second axial rotation modules 20 also has a second micro motor 21 which drives the second axial rotation modules 20 rotating. The first micro motor 19 and the second micro motor 20 are electronically connected with the control unit 26.

It is worth noted that the lighting capture modules attached to opposite lateral sides of said wearable frame in symmetry are crucial to generate a stereo image of target surgical view in human brain. A surgical operator can precisely put his hands in positions at space according to the stereo views. In other words, non-stereo image will lead to loss of depth perception of the surgeon. Thus, the exact distance of the target surgical view will be missed, and the surgeon cannot control his hands precisely. Therefore, a three-dimensional image of target surgical view is very important in performing precise surgical operation especially in micro-surgery.

As shown in FIG. 4, the display modules 14 are connected directly on both sides of the wearable frame 10 through the connectors 16. The display modules 14 are electronically connected with the control unit and fixed to said wearable frame 10 for image display purpose. The display modules 14, provide small screens which show the magnified surgical view, are positioned in front of the eyes. The actual position of the display modules 14 is equivalent to the position of the traditional optical loupes worn by the surgeons. The display module 14 is preferably a Virtual Retinal Display (VRD), but can also be any kind of digital displays (such as, but not limited to, LCD, LED, data glass . . . ).

As shown in FIG. 5, the sensor 28 built inside the lighting capture module 12 receives command signal by the operator to control the functions inside the digital loupe device. The signal may be, but not limited to, a verbal, touch, electronically or wireless transmitted command. An example is that when the surgeon wants to adjust to a higher magnified surgical view, he says the word "magnify". The sensor 28 will receive the command and send feedback signal to the control unit 26. The control unit 26 will adjust the capturing element 24 to zoom in the images and show the magnified images on the display modules 14.

The control unit 26 is either built inside the lighting capture module 12 or remotely located. If the control unit 26 is located at a remote site, its connections to the lighting capture module 12, the display modules 14, the sensor 28, the first axial rotation modules 18 and the second axial rotation modules 20 will be set through wireless or cable transmission.

Figure 6:
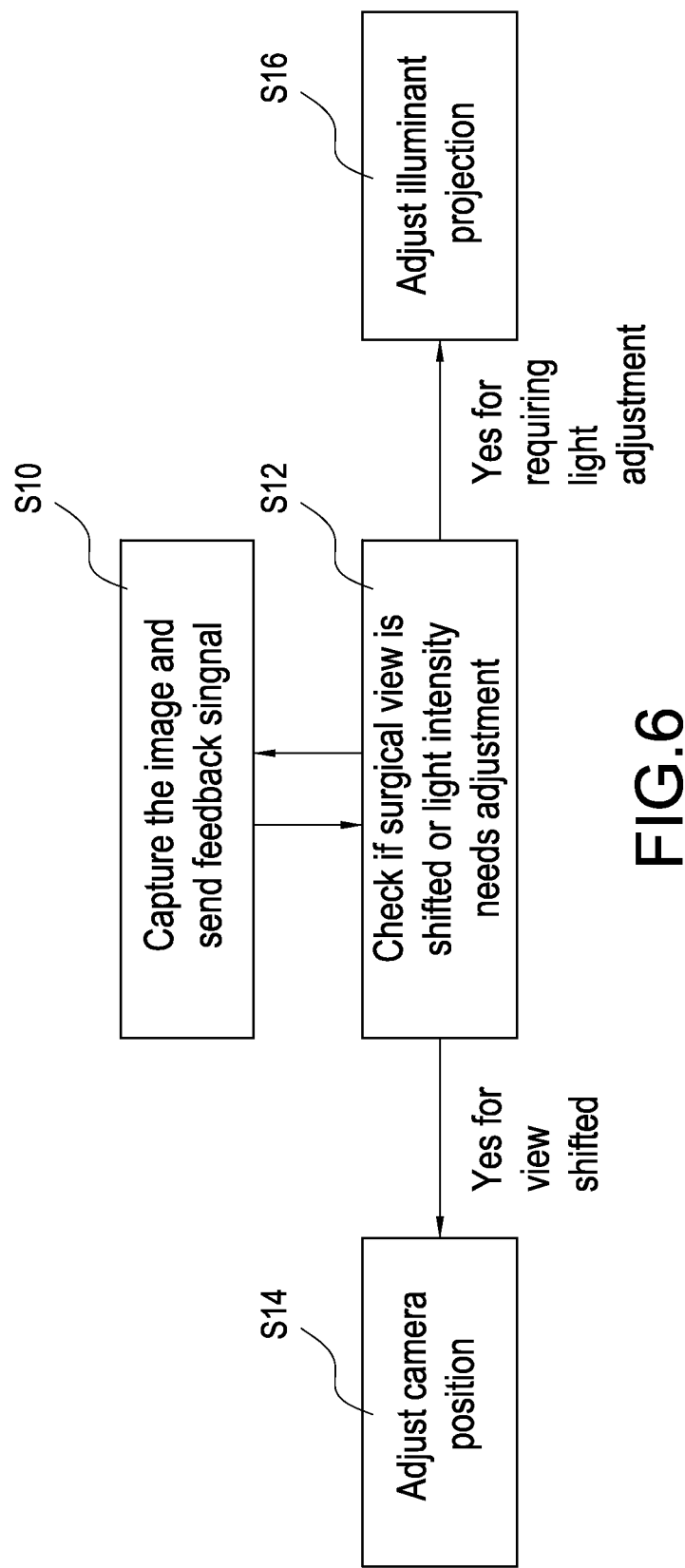
FIG. 6 is the flowchart of the view stabilizing method of the present invention.

FIG. 6 shows the view stabilizing method of the present invention. As shown in step S10, the capturing element 24 captures a surgical view and sends feedback signal to the control unit 26 randomly, constantly and periodically. Then, as shown in step S12, the control unit 26, upon receiving the feedback signal for comparing with the previously captured image of the surgical view, reports view displacement shift and light intensity result. If the result revealed a displacement shift larger than the tolerant threshold set forth in system, the adjustment of view is required. Then, as shown in step S14, the control unit 26, based on the reported displacement shift result, moves the lighting capture module 12 via the first axial rotation modules 18 and the second axial rotation modules 20 in order to keep the shifted surgical view back to the original location previously. If the result also revealed an inappropriate light intensity of the image either brighter or darker than the threshold set forth in system, the adjustment of light intensity is required. Then, as shown in step S16, the control unit 26, based on the reported light intensity result, adjusts the lighting element 22 to provide proper light intensity and focus on the surgical view in order to keep the image in good brightness condition for the surgeon.

The step S14 and step S16 can be performed separately, i.e., after the step S10, the control unit 26 receives the feedback signal and decides adjusting either only the view shift, only the light intensity or both.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A digital loupe device for viewing microscopic view, the digital loupe device comprising:
   a wearable frame;
   a pair of lighting capture modules separately mounted on opposite lateral sides of said wearable frame in symmetry, the lighting capture modules capturing images of target views and sending according feedback signals;
   at least one axial rotation modules connected with the lighting capture modules and mounted to said wearable frame;
   at least one control unit installed in the lighting capture module, electronically connected to the axial rotation modules and the lighting capture modules for receiving feedback signals used to move the lighting capture modules via the axial rotation modules until the images of the desired views being obtained; and
   a pair of display modules electronically connected with the control unit and fixed to said wearable frame for image display purpose,
   wherein the control unit receives the feedback signal, compares with the previous image of the view and moves the lighting capture module via the axial rotation module according to the result obtained in order to move the lighting capture module till the image of the desired view is obtained;
   wherein the control unit receives the feedback signal, compares with the light intensity of the view and adjusts the light intensity via the lighting element of the lighting capture module according to the result obtained in order to adjust the light intensity till the desired image light intensity is obtained.

2. The digital loupe device as in claim 1, wherein the device further comprises plural of connectors that connect the display modules to the wearable frame.

3. The digital loupe device as in claim 1, wherein the display module is a Virtual Retinal Display, LCOS projection display, LCD display, LED display or data glass.

4. The digital loupe device as in claim 2, wherein the distance between the display modules on both sides of the digital loupe device is adjustable via adjusting the connectors to fit the inter pupil distance.

5. The digital loupe device as in claim 1, wherein the lighting capture modules capture periodically the images to send feedback signals.

6. The digital loupe device as in claim 1, wherein the wearable frame is a supporting set or a supporting frame attached to the head of operator.

7. The digital loupe device as in claim 1, wherein the control unit can be set exteriorly or be integrated in the lighting capture module or in the wearable frame.

8. The digital loupe device as in claim 1, wherein the axial rotation modules further comprise first axial rotation modules to provide lateral movement of the lighting capture modules and second axial rotation modules to provide vertical movement of the lighting capture modules.

9. The digital loupe device as in claim 1, wherein each of the lighting capture modules comprises a lighting element, a capturing element and a sensor.

10. The digital loupe device as in claim 9, the capturing element comprises an auto-focus digital camera with zoom in/out capability, recording the view image and sending feedback signal to the control unit.

11. The digital loupe device as in claim 9, the lighting element adjusts the light intensity and focus according to the control signal sent by the control unit.

12. The digital loupe device as in claim 9, the sensor receives signal which is triggered by sound, vibration, pressure, temperature, light or forces, and the digital loupe device is activated through the signal via the control unit.

13. The digital loupe device as in claim 9, wherein the display module shows the image recorded by the capturing element or other image/information sent by the control unit.

14. The digital loupe device as in claim 1, wherein the first axial rotation modules further has a first micro motor which drives the first axial rotation modules rotating, and the second axial rotation modules also has a second micro motor which drives the second axial rotation modules rotating, the first micro motor and the second micro motor are electronically connected with the control unit.

15. An automatic view stabilizing method which uses at least one axial rotation module and at least one lighting capture module set on it, and the automatic view stabilizing method consisting of the following steps:
   at least one lighting capture module illuminating a target view to capture the image of the target view and send a feedback signal, wherein the lighting capture module is mounted on a wearable frame; and
   the feedback signal being received for moving the lighting capture module via the axial rotation module till the image of the desired view being captured, wherein the axial rotation module is mounted on the wearable frame;
   receiving the feedback signal for comparing with the previous image of the view to report displacement shift result;
   based on the reported displacement shift result, moving the lighting capture module via the axial rotation module till the image of the desired view being obtained;
   adjusting the light intensity via the lighting element of the lighting capture module till the desired image light intensity being obtained;
   receiving the feedback signal for comparing with the light intensity of the view to report light intensity result; and
   based on the reported light intensity result, adjusting the light intensity and focus via the lighting element of the lighting capture module till the desired image light intensity being obtained.

16. The digital loupe device as in claim 14, wherein the two images captured by the lighting capture modules on both sides are automatically aligned and superimposed at some points before showing on the display modules.

* * * * *